(12) United States Patent
Suciu et al.

(10) Patent No.: US 8,967,944 B2
(45) Date of Patent: Mar. 3, 2015

(54) ACCESSORY GEARBOX BUFFER COOLING AIR PUMP SYSTEM

(75) Inventors: Gabriel L. Suciu, Glastonbury, CT (US); Jorn A. Glahn, Manchester, CT (US); Brian D. Merry, Andover, CT (US); Christopher M. Dye, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 819 days.

(21) Appl. No.: 13/219,913

(22) Filed: Aug. 29, 2011

(65) Prior Publication Data

US 2013/0047623 A1 Feb. 28, 2013

(51) Int. Cl.
*F02C 6/04* (2006.01)
*F02K 3/00* (2006.01)
*F01D 25/12* (2006.01)
*F02C 7/32* (2006.01)

(52) U.S. Cl.
CPC ............... *F02K 3/00* (2013.01); *F01D 25/125* (2013.01); *F02C 7/32* (2013.01); *F05D 2260/4031* (2013.01)
USPC ............... 415/1; 415/111; 415/115; 415/116; 415/124.1; 415/180

(58) Field of Classification Search
CPC ........... F10D 25/125; F02C 7/32; F02K 3/00; F05D 2260/4031
USPC ................. 415/1, 110, 111, 115, 116, 122.1, 415/124.1, 180
See application file for complete search history.

(56) References Cited

U.S. PATENT DOCUMENTS

| | | | |
|---|---|---|---|
| 4,156,342 A | 5/1979 | Korta et al. | |
| 4,351,150 A | 9/1982 | Schulze | |
| 4,561,246 A | 12/1985 | Hovan | |
| 4,709,545 A | 12/1987 | Stevens et al. | |
| 5,039,281 A * | 8/1991 | Johnston | 417/212 |
| 5,143,329 A * | 9/1992 | Coffinberry | 244/209 |
| 7,093,418 B2 | 8/2006 | Morris et al. | |
| 7,383,686 B2 | 6/2008 | Aycock et al. | |
| 7,591,631 B2 | 9/2009 | Hendricks et al. | |
| 7,955,046 B2 * | 6/2011 | McCune et al. | 415/122.1 |
| 8,602,717 B2 * | 12/2013 | Suciu et al. | 415/122.1 |
| 2011/0203293 A1 * | 8/2011 | Glahn | 60/785 |

* cited by examiner

*Primary Examiner* — Igor Kershteyn
(74) *Attorney, Agent, or Firm* — Carlson, Gaskey & Olds, P.C.

(57) ABSTRACT

A buffer air pump provides pressurized cooling air for cooling components of the gas turbine engine. The buffer air pump is supported on and/or within an accessory gearbox and draws bypass air in through an inlet manifold. An impeller supported within a scroll housing pressurizes the incoming bypass air and directs the pressurized air through passages to a component requiring cooling. The buffer air pump draws in relatively cool air from the bypass flow, pressurizes the air with the impeller and sends the air through conduits and passages within the gas turbine engine to the component that requires cooling such as a bearing assembly.

13 Claims, 5 Drawing Sheets

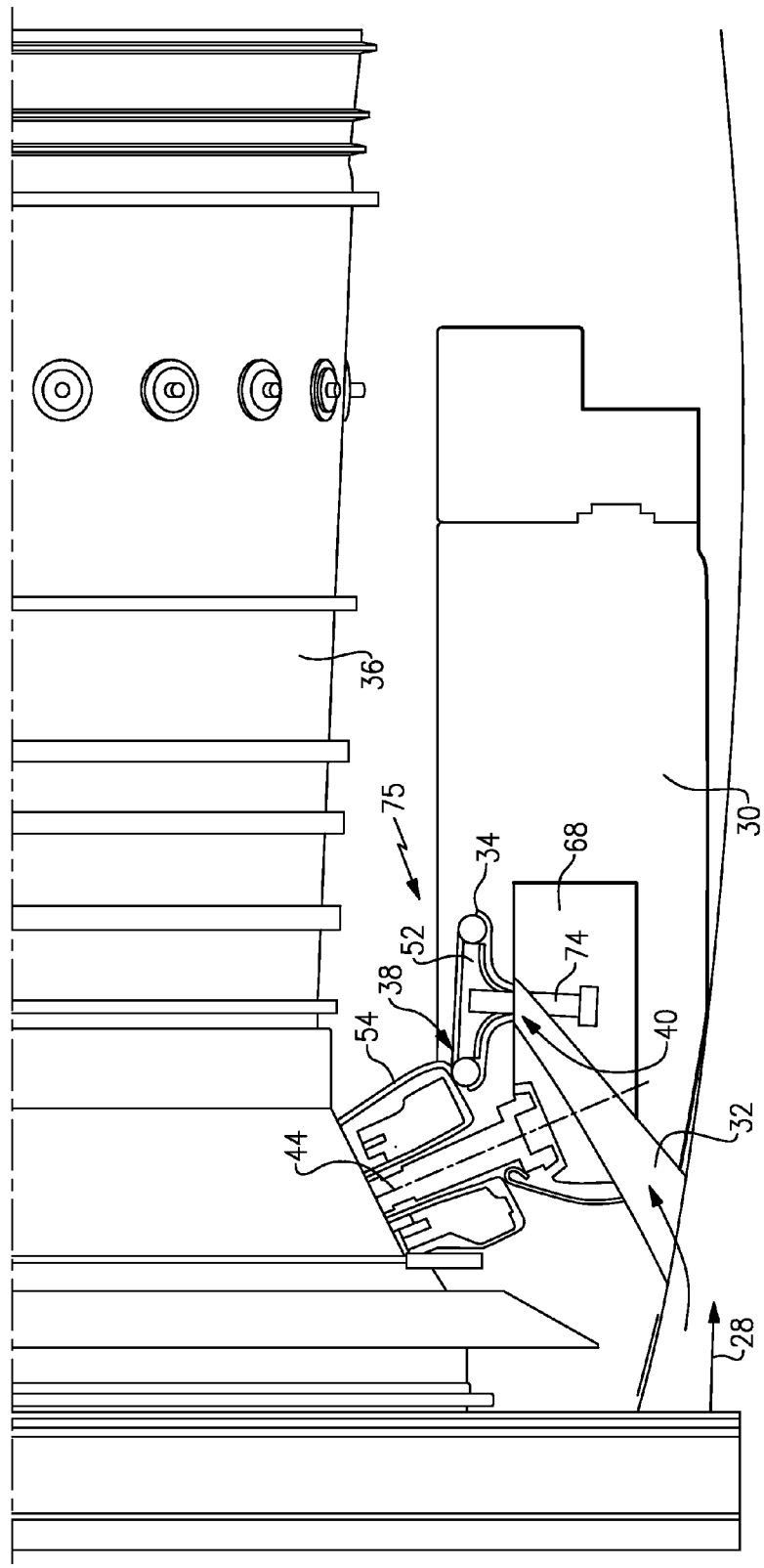

ACCESSORY GEARBOX BUFFER COOLING AIR PUMP SYSTEM

BACKGROUND

This disclosure generally relates to system for proving cooling air to cool engine components. More particularly, this disclosure relates to a pump for pressurizing bypass air flow for cooling desired engine components.

Gas turbine engines typically include air driven systems for cooling systems within the engine. Buffer cooling systems use relatively cool air drawn from early compressor stages to cool hot components in other parts of the engine. The temperature of the cooling air must be lower than the part or compartment to be cooled, and is at a higher pressure than the air within that compartment. In order to obtain the desired temperature of the cooling air, heat exchangers are required to further cool air prior to delivery to hot components.

SUMMARY

A disclosed buffer air pump provides pressurized cooling air for cooling components of the gas turbine engine. The buffer air pump is supported on and/or within an accessory gearbox and draws bypass air in through an inlet manifold. An impeller supported within a scroll housing pressurizes the incoming bypass air and directs the pressurized air through passages to a component requiring cooling. The buffer air pump draws in relatively cool air from the bypass flow, pressurizes the air with the impeller and sends the air through conduits and passages within the gas turbine engine to the component that requires cooling such as for example, a bearing assembly.

One disclosed example buffer air pump includes an impeller mounted to a tower shaft and rotates within a scroll housing mounted to the housing of the accessory gearbox.

These and other features disclosed herein can be best understood from the following specification and drawings, the following of which is a brief description.

BRIEF DESCRIPTION OF THE DRAWINGS

FIG. 5 is another schematic representation of an accessory gearbox including an example integrated buffer air pump.

DETAILED DESCRIPTION

Figure 1:
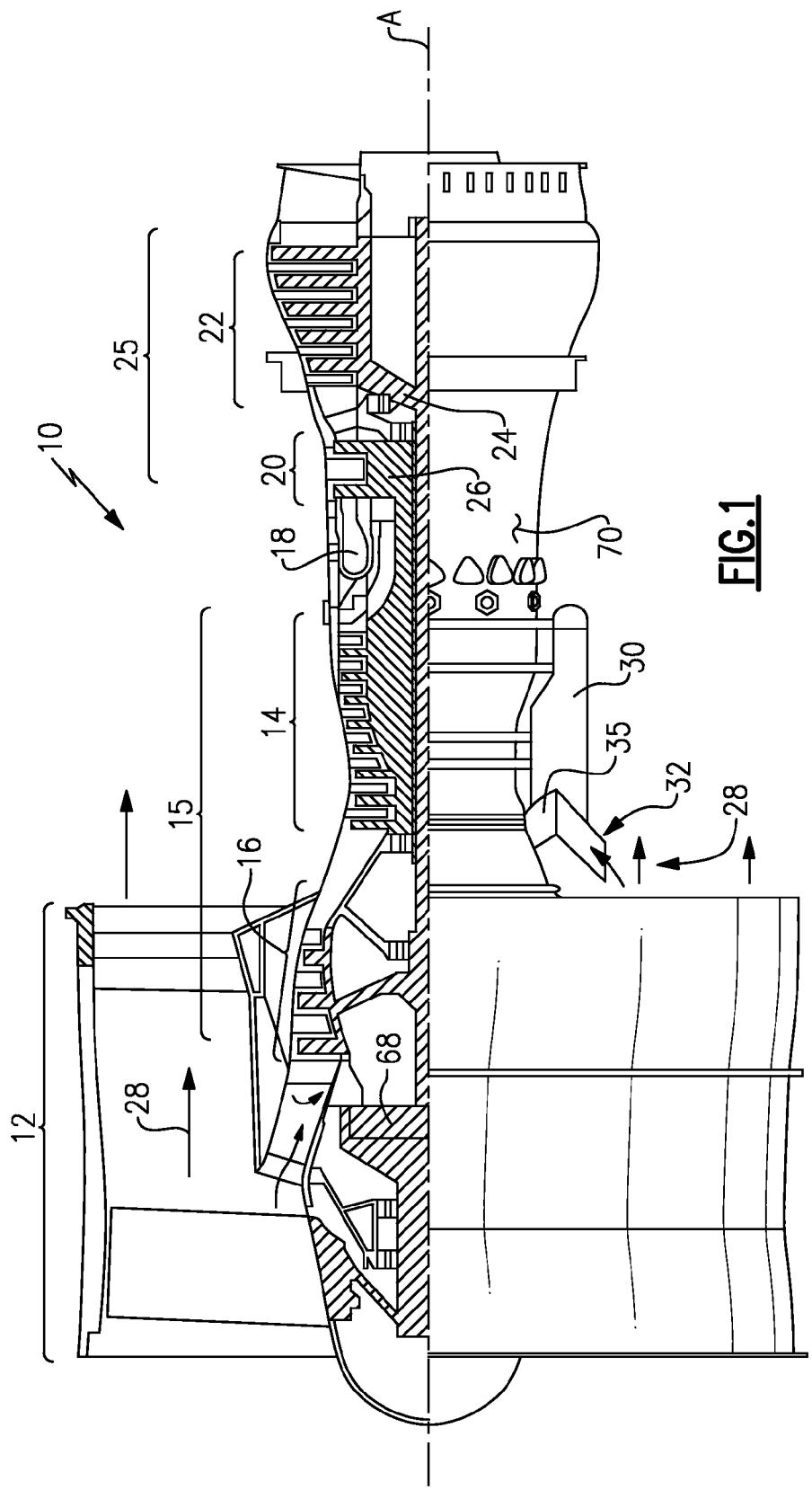
FIG. 1 is a schematic representation of an example gas turbine engine.

Referring to FIG. 1, a gas turbine engine includes a fan section 12, a compressor section 15, a combustor 18 and a turbine section 25. The example compressor section 15 includes a low pressure compressor section 16 and a high pressure compressor section 14. The turbine section 25 includes a high pressure turbine 20 and a low pressure turbine 22. The high pressure compressor section 14, high pressure turbine 20, the low pressure compressor section 16 and low pressure turbine 22 are supported on corresponding high and low spools 24, 26 that rotate about a main axis A.

Air drawn in through the compressor section 15 is compressed and fed into the combustor 18. In the combustor 18, the compressed air is mixed with fuel and ignited to generate a high speed gas stream. This gas stream is drives the turbine section 25.

The example gas turbine engine 10 includes a fan section 12 driven through a tower shaft 50 by the low spool 24. Bearings support rotation of the high and low spools 24, 26 and are exposed to the high temperatures produced during operation of the gas turbine engine 10 and are cooled using bypass airflow. Bypass airflow indicated by arrows 28 flows around the core of the gas turbine engine 10 and thereby remains at a temperature much cooler than air from the compressor section 15. An accessory gearbox 30 is mounted to an outer housing 70 and includes a buffer air pump 35 for pressurizing bypass airflow for cooling portions of the gas turbine engine 10, such as bearings supporting rotation of the low and high spools 24, 26.

Figure 2:
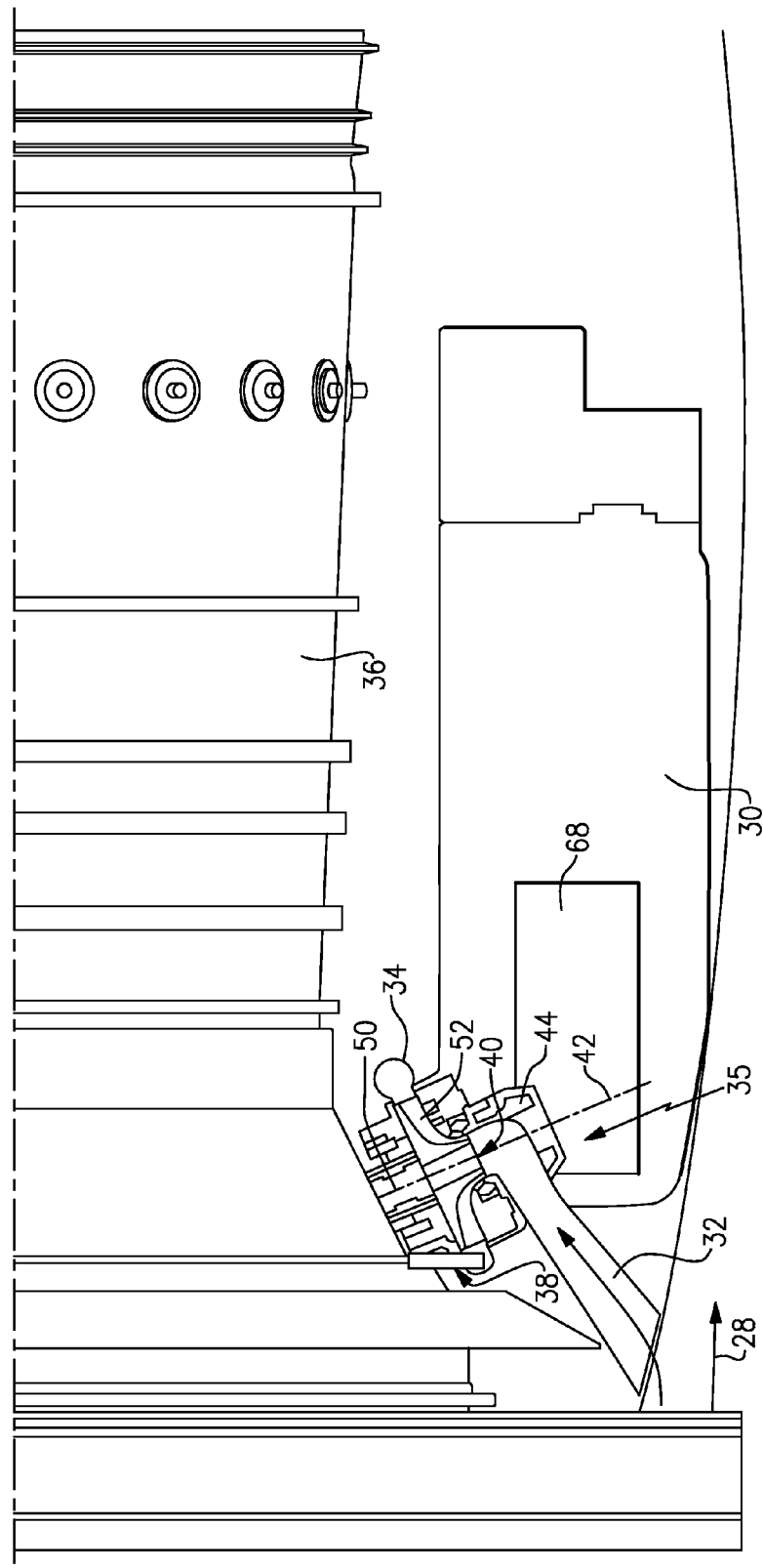
FIG. 2 is an enlarged schematic representation of an accessory gearbox including an example integrated buffer air pump.

Referring to FIG. 2, the accessory gearbox 30 includes a gear train 68 driven by an end 44 of a tower shaft 50 (FIG. 3) extending from the gas turbine engine 10. The example accessory gearbox 30 supports an inlet manifold 32 that draws bypass air 28 into the buffer air pump 35 that provides cool pressurized air for cooling components of the gas turbine engine 10.

The inlet manifold 32 draws bypass air 28 into a scroll housing 34. In the scroll housing 34, the incoming bypass air is compressed to a desired pressure and driven through an outlet 38 into cooling passages that direct the buffer cooling air to portions within the gas turbine engine 10 that require cooling. The example buffer air pump 35 includes an impeller 52 mounted to the end 44 of the towershaft 50.

Figure 3:
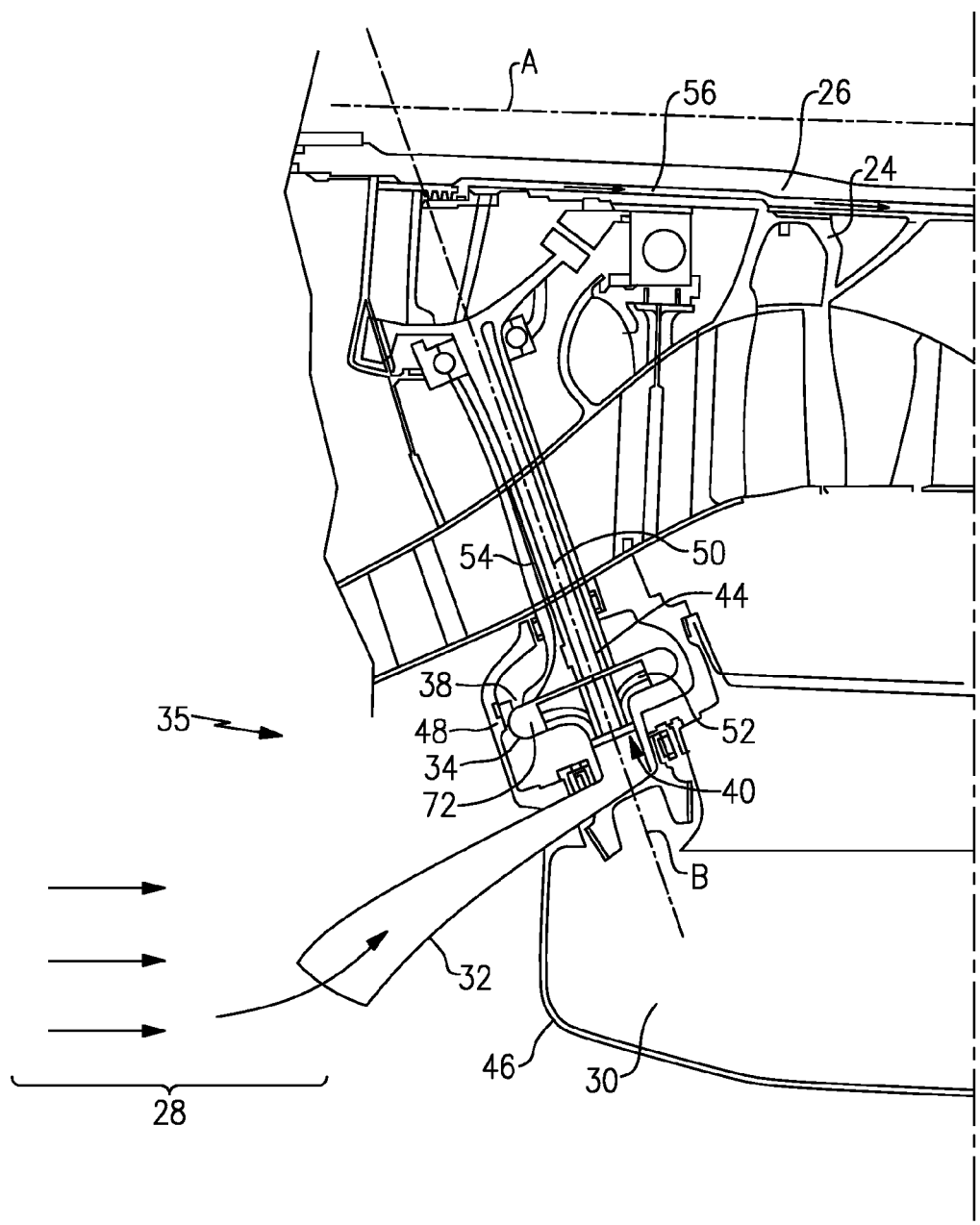
FIG. 3 is an enlarged schematic view of the example buffer air pump.

Referring to FIG. 3 with continued reference to FIG. 2, the buffer air pump 35 includes the impeller 52 mounted to the tower shaft 50. Thereby, the impeller 52 rotates with the tower shaft 50 about axis B during operation of the gas turbine engine 10 at a speed common with that of the tower shaft 50. The axis B is transverse to the main axis A of the gas turbine engine 10. The impeller 52 is supported by and rotates within the scroll housing 34.

The example scroll housing 34 defines an inlet 40 that receives incoming bypass air 28. The inlet 40 is disposed about the axis B and directs air to a top portion of the impeller 52. The spinning impeller 52 drives the incoming bypass air 28 radially outward to volute passage 72 defined by the scroll housing 34. The outlet between the impeller 52 and the passage 72 is open entirely about an outer periphery of the impeller 52. The bypass air 28 exiting radially form the impeller 52 is at a pressure higher than the air provided at the inlet 40. In this example, the impeller 52 pressurizes the bypass air to a pressure greater than 50 psi (344 KPa). As appreciated, the impeller 52 and scroll housing 34 can be configured to provide any desired pressure rise.

Air compressed by the impellor 52 is exhausted from the volute passage 72 through an outlet 38. The outlet 38 is in communication with a passage 54 that directs the cooling air to an internal portion of the gas turbine engine 10. In this example, the passage 54 directs the now pressurized cooling air to an annular gap 56 disposed between the low spool 26 and the high spool 24. High pressure cooling air within the gap 56 is driven the length of the engine 10 toward bearing compartments 60, 62 disposed at an aft portion of the gas turbine engine 10.

Figure 4:
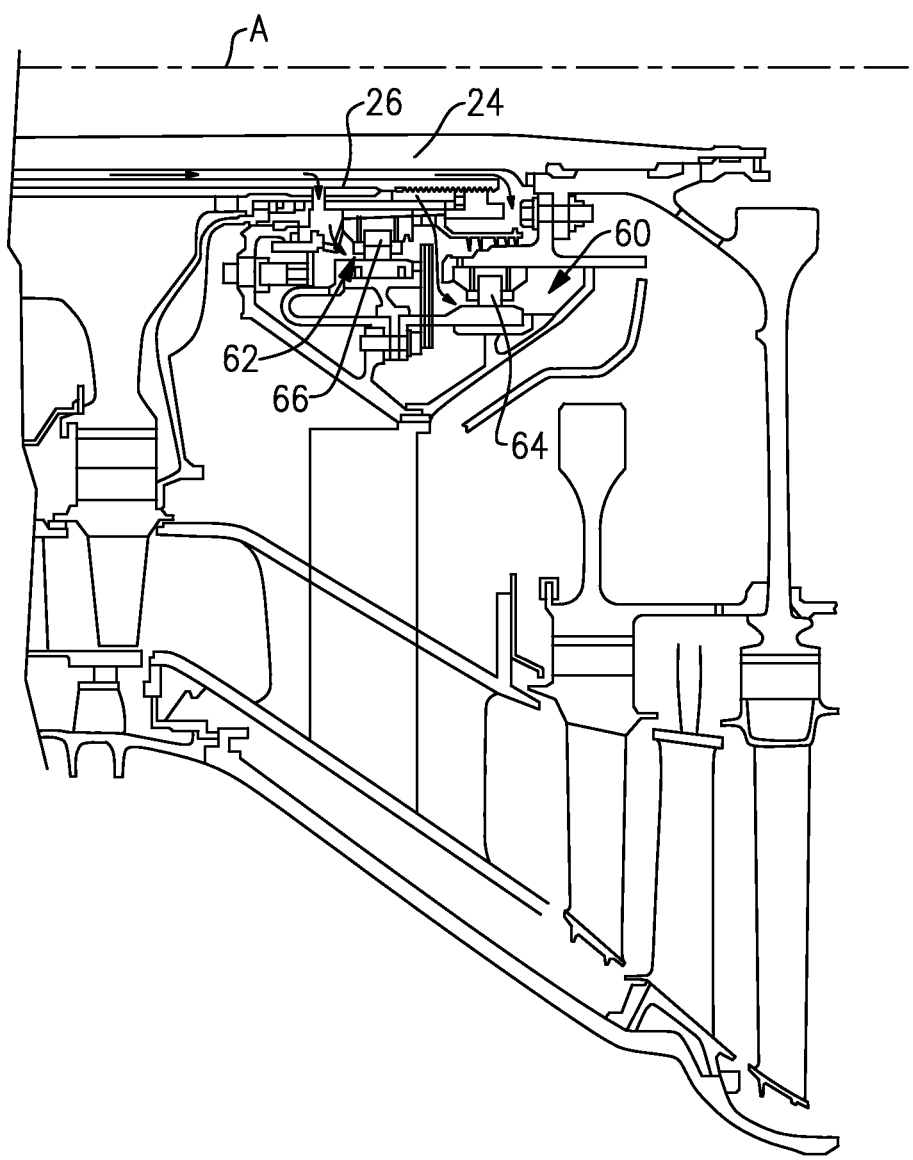
FIG. 4 is another schematic representation of a bearing compartment receiving buffer cooling air.

Referring to FIG. 4 with continued reference to FIG. 3, cooling air provided by the buffer air pump 35 is forced through the passage 54 into the annular gap 56 between the low spool 26 and the high spool 24. Openings from the annular gap 56 communicate the cooling air with bearing compartments 60 and 62 to provide cooling airflow to bearings 66 and 64. Moreover, the cooling air may simply flow axially outward to the end of the interface between the low spool and high spool 24, 26. It should be understood that the openings to communicate cooling air to the bearing compartments 60, 62 may be of any size, shape and configuration as are required to provide the desired cooling airflow.

Incoming cooling air from bypass flow 28 is at a temperature much lower than that of the internal components of the gas turbine engine 10. Accordingly, a separate heat exchanger is not required to cool air utilized for cooling specific features within a gas turbine engine. In this example, the buffer cooling air is desired to be at a temperature below 450° F. (232° C.) and at a pressure greater than 50 psi (344 KPa). This desired temperature and pressure provides not only the cooling function but also the driving force to push the air from the inlet manifold and exit portion of the impeller 52 through the passage 54 and the annular gap between the spools 24, 26 to the bearing compartments 60, 62 of the gas turbine engine 10.

Moreover, it is also within the contemplation of this invention that the impellor 52 and scroll housing 34 could be mounted as an integral portion of the tower shaft housing 48. Tower shaft housing 48 attaches to the accessory gearbox housing 46 and supports rotation of the tower shaft 50.

Referring to FIG. 5, another example buffer air pump 75 includes an impeller 52 driven by a shaft 74 of the gear train 68 supported within the accessory gearbox 30. The scroll housing 34 is supported within the accessory gearbox housing 46 as is the inlet manifold 32. Including the buffer air pump 75 within the accessory gearbox 30 simplifies assembly and desirably reduces weight.

Accordingly, the example buffer cooling air pump provides cooling air at a desired pressure and temperature without requiring extensive external duct work and heat exchangers.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. An accessory gearbox for a gas turbine engine comprising:
   an accessory gearbox housing supporting a gear train driven by a tower shaft of a gas turbine engine, wherein a tower shaft housing supports rotation of the tower shaft;
   an inlet manifold supported by the housing receiving bypass airflow;
   an impeller supported for rotation within the tower shaft housing, the impeller in communication with the inlet manifold for pressurizing the received bypass airflow; and
   an outlet receiving pressurized cooling airflow from the impeller for communicating cooling air to an internal component of the gas turbine engine.

2. The accessory gearbox as recited in claim 1, wherein the impeller is mounted to rotate at a speed common with the tower shaft.

3. The accessory gearbox as recited in claim 1, wherein the tower shaft housing includes an inlet from the inlet manifold disposed about the axis of rotation of the impeller and an outlet disposed at an outer periphery of the tower shaft housing.

4. The accessory gearbox as recited in claim 3, wherein the outlet comprises a scroll passage defined by the tower shaft housing in communication with a cooling air passage within the gas turbine engine.

5. The accessory gearbox as recited in claim 1, wherein a passage in communication with the outlet includes an annular passage about a shaft and the component comprises a bearing assembly.

6. A gas turbine engine comprising:
   first and second spools rotatable about a common axis;
   a bearing assembly supporting rotation of at least one of the first and second spools;
   a tower shaft drivable by one of the first and second spools and supported for rotation with a tower shaft housing;
   an accessory gearbox drivable by the towershaft, wherein the accessory gearbox includes an accessory gearbox housing and the tower shaft housing is supported on the accessory gearbox;
   an inlet manifold for receiving bypass airflow; and
   an impeller supported within a scroll housing defined within the tower shaft housing, the impeller configured for pressurizing the bypass airflow and directing the pressurized bypass airflow to cool the bearing assembly.

7. The gas turbine engine as recited in claim 6, wherein the impeller is mounted on the tower shaft.

8. The gas turbine engine as recited in claim 6, wherein the scroll housing comprises an inlet disposed about an axis of rotation of the impeller and an outlet disposed about an outer periphery of the impeller.

9. The gas turbine engine as recited in claim 6, including a passage for communicating bypass airflow from the impeller to the bearing assembly, the passage including at least a portion defined between the first and second spools.

10. A method of providing cooling air to a component of a gas turbine engine, the method comprising:
    receiving bypass airflow through an intake manifold;
    pressurizing the bypass airflow with an impeller driven by a tower shaft independent of a compressor of the gas turbine engine, wherein the impeller is supported for rotation within a tower shaft housing supporting rotation of the tower shaft; and
    communicating pressurized bypass airflow through passages defined within the gas turbine engine to a component.

11. The method as recited in claim 10, towershaft rotates about an axis disposed transverse to a main axis of the gas turbine engine.

12. The method as recited in claim 11, including supporting the tower shaft housing and the impeller for rotation with the towershaft on an accessory gearbox mounted to the gas turbine engine.

13. The method as recited in claim 12, wherein the tower shaft housing comprises a scroll housing within which the impeller rotates.

* * * * *

UNITED STATES PATENT AND TRADEMARK OFFICE
CERTIFICATE OF CORRECTION

PATENT NO. : 8,967,944 B2  Page 1 of 1
APPLICATION NO. : 13/219913
DATED : March 3, 2015
INVENTOR(S) : Gabriel L. Suciu et al.

It is certified that error appears in the above-identified patent and that said Letters Patent is hereby corrected as shown below:

IN THE CLAIMS:

In claim 11, line 49, prior to "towershaft" insert --wherein the--

Signed and Sealed this
Twenty-first Day of July, 2015

Michelle K. Lee
*Director of the United States Patent and Trademark Office*